United States Patent
Takahashi et al.

(10) Patent No.: US 9,014,992 B2
(45) Date of Patent: Apr. 21, 2015

(54) SENSOR EQUIPPED WHEEL SUPPORT BEARING ASSEMBLY

(75) Inventors: Toru Takahashi, Iwata (JP); Hiroshi Isobe, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 700 days.

(21) Appl. No.: 12/735,700

(22) PCT Filed: Feb. 10, 2009

(86) PCT No.: PCT/JP2009/000524
§ 371 (c)(1),
(2), (4) Date: Aug. 10, 2010

(87) PCT Pub. No.: WO2009/101793
PCT Pub. Date: Aug. 20, 2009

(65) Prior Publication Data
US 2010/0310202 A1    Dec. 9, 2010

(30) Foreign Application Priority Data
Feb. 15, 2008 (JP) ................................ 2008-033996

(51) Int. Cl.
*F16C 41/00*    (2006.01)
*F16C 19/52*    (2006.01)
(Continued)

(52) U.S. Cl.
CPC ............. *F16C 19/52* (2013.01); *B60B 27/0005* (2013.01); *B60B 27/0068* (2013.01); *B60B 27/0094* (2013.01); *F16C 19/186* (2013.01); *G01L 5/0019* (2013.01)

(58) Field of Classification Search
CPC ............ B60B 27/0005; B60B 27/0068; B60B 27/0094; G01L 5/0019; G01L 5/0047
USPC .............................. 702/42; 384/448, 544, 589
See application file for complete search history.

(56) References Cited

U.S. PATENT DOCUMENTS

| 4,341,122 A | 7/1982 | Lechler et al. |
| 4,693,494 A | 9/1987 | Buma et al. |

(Continued)

FOREIGN PATENT DOCUMENTS

| EP | 2006653 A1 * | 12/2008 |
| JP | 62-49568 | 10/1987 |

(Continued)

OTHER PUBLICATIONS

Chinese Office Action mailed Dec. 26, 2011 issued in corresponding Chinese Patent Application No. 200980104899.9.
(Continued)

*Primary Examiner* — John Breene
*Assistant Examiner* — Yaritz H Perez Bermudez (57) ABSTRACT

A wheel support bearing assembly includes rolling elements interposed between outer and inner members, and sensor units are fitted to one of the outer and inner members, which serves as a stationary member. Each of the sensor units includes a strain generating member, having two or more contact fixing segments fixed to the stationary member, and two or more sensors fitted to the strain generating member for detecting strains occurring in the strain generating member. The two or more contact fixing members are arranged at the same axial positions of the outer diametric surface of the stationary member in a fashion spaced in a circumferential direction. A calculating section is provided for estimating the load acting in the wheel support bearing assembly by the sum of respective output signals of the sensors.

7 Claims, 8 Drawing Sheets

(51) Int. Cl.
  *B60B 27/00* (2006.01)
  *F16C 19/18* (2006.01)
  *G01L 5/00* (2006.01)

(56) References Cited

U.S. PATENT DOCUMENTS

| | | |
|---|---|---|
| 4,996,882 A | 3/1991 | Kistler |
| 6,619,102 B2 | 9/2003 | Salou et al. |
| 6,634,208 B2 | 10/2003 | Salou et al. |
| 6,971,799 B2 | 12/2005 | Sato et al. |
| 7,197,387 B2 | 3/2007 | Inoue et al. |
| 7,882,752 B2 | 2/2011 | Ozaki et al. |
| 8,167,497 B2 | 5/2012 | Ozaki et al. |
| 2002/0012484 A1 | 1/2002 | Salou et al. |
| 2002/0061148 A1 | 5/2002 | Salou et al. |
| 2003/0218548 A1 | 11/2003 | Sato et al. |
| 2005/0222740 A1 | 10/2005 | Inoue et al. |
| 2006/0153482 A1* | 7/2006 | Koike et al. ............... 384/448 |
| 2007/0074587 A1* | 4/2007 | Mol et al. ............... 73/862.322 |
| 2009/0038414 A1 | 2/2009 | Ozaki et al. |
| 2009/0097791 A1 | 4/2009 | Ozaki et al. |
| 2009/0114004 A1 | 5/2009 | Ozaki et al. |
| 2010/0135604 A1 | 6/2010 | Ozaki et al. |

FOREIGN PATENT DOCUMENTS

| | | |
|---|---|---|
| JP | 63-256832 | 10/1988 |
| JP | 4-39553 | 9/1992 |
| JP | 2002-98138 | 4/2002 |
| JP | 2003-530565 | 10/2003 |
| JP | 2004-3601 | 1/2004 |
| JP | 2004-514900 A | 5/2004 |
| JP | 2006-119000 | 5/2006 |
| JP | 2006-170352 | 6/2006 |
| JP | 2007-57299 | 3/2007 |
| JP | 2007-057302 | 3/2007 |
| JP | 2007-292158 | 11/2007 |
| WO | WO 01/77634 A2 | 10/2001 |
| WO | 02/44678 A1 | 6/2002 |
| WO | 2004/018273 | 3/2004 |
| WO | WO 2007/018072 | 2/2007 |
| WO | WO 2007/066593 | 6/2007 |
| WO | 2007/105367 A1 | 9/2007 |
| WO | WO 2007105367 A1 * | 9/2007 |

OTHER PUBLICATIONS

Chinese Office Action dated Nov. 25, 2011 issued in related Chinese Patent Application No. 200880117200.8.

U.S. Appl. No. 12/735,700, filed May 25, 2010, Hiroshi Isobe, NTN Corporation.

U.S. Appl. No. 12/735,412, filed Dec. 23, 2010, Toru Takahashi, NTN Corporation.

International Preliminary Report on Patentability mailed Jun. 17, 2010 in a possible related International Patent Application PCT/JP2008/003398.

International Preliminary Report on Patentability mailed Dec. 9, 2010 in a possible related International Patent Application PCT/JP2009/001610.

English Translation of the International Preliminary Report on Patentability mailed Jun. 17, 2010 in corresponding International Patent Application PCT/JP2008/003398.

European Extended and Supplementary Search Report dated Feb. 27, 2012 issued in corresponding European Patent Application No. 09711226.2.

Chinese Office Action issued Apr. 19, 2012 is corresponding Chinese Patent Application No. 200980104899.9.

International Search Report for PCT/JP2009/000524, mailed Mar. 17, 2009.

Japanese Office Action mailed Jul. 3, 2012 issued in corresponding Japanese Patent Application No. 2008-033996.

Japanese Office Action mailed May 29, 2012 issued in related Japanese Patent Application No. 2007-305302.

Japanese Office Action mailed May 29, 2012 issued in related Japanese Patent Application No. 2007-305300.

Japanese Office Action issued Sep. 4, 2012 in related Japanese Patent Application No. 2007-305302.

Chinese Office Action issued Aug. 30, 2012 in related Chinese Patent Application No. 200880117200.8.

U.S. Office Action issued Aug. 10, 2012 in related U.S. Appl. No. 12/734,826.

English Translation of the International Preliminary Report on Patentability mailed Oct. 14, 2010 in corresponding International Patent Application PCT/JP2009/000524.

Chinese Office Action mailed Feb. 28, 2013 for corresponding Chinese Application No. 200880117200.8.

Japanese Office Action mailed Feb. 26, 2013 for corresponding Japanese Application No. 2009-088788.

U.S. Office Action mailed Mar. 22, 2013 for corresponding U.S. Appl. No. 12/736,412.

U.S. Notice of Allowance issued Nov. 13, 2012 in copending U.S. Appl. No. 12/734,826.

U.S. Office Action issued Dec. 17, 2012 in copending U.S. Appl. No. 12/736,412.

European Search Report issued Jul. 24, 2013 in corresponding European Patent Application No. 08855199.9.

* cited by examiner

SENSOR EQUIPPED WHEEL SUPPORT BEARING ASSEMBLY

CROSS REFERENCE TO THE RELATED APPLICATIONS

This application claims the benefit under 35 U.S.C. Section 371 of PCT International Application No. PCT/JP2009/000524, filed Feb. 10, 2009, which claimed priority to Japanese patent application No. 2008-033996, filed Feb. 15, 2008, the entire disclosures of which are herein incorporated by reference as a part of this application.

FIELD OF THE INVENTION

The present invention relates to a sensor-equipped wheel support bearing assembly having a load sensor incorporated thereon for detecting a load imposed on a bearing unit employed in an automotive vehicle.

BACKGROUND ART

As a technique to detect a load imposed on each of vehicle wheels of an automotive vehicle, a sensor-equipped wheel support bearing assembly has also been suggested, in which the load is detected by detecting a strain occurring in a flange outer diametric face of an outer ring of the wheel support bearing assembly that serves as a stationary ring. (See, for example, the Patent Document 1 listed below.). In addition, a wheel support bearing assembly including a strain gauge provided on an outer ring of the wheel support bearing assembly for the detection of a strain has been suggested. (See, for example, the Patent Document 2 listed below.)

Further, the sensor equipped wheel support bearing assembly has also hitherto been suggested, in which a sensor unit made up of a strain generating member and a strain sensor fitted to this strain generating member is fitted to the stationary ring of the bearing unit, which strain generating member includes a contact fixing segment at least two locations relative to the stationary ring and has a cutout defined at least one location between the neighboring contact fixing segments, with the strain sensor arranged in this cutout. (See, for example, the Patent Document 3 listed below.)

According to the sensor equipped wheel support bearing assembly disclosed in the Patent Document 3 spura, when the load acts on a rotatable ring incident to travel of the automotive vehicle, the stationary ring is deformed by the load acting through rolling elements and such deformation brings a strain in the sensor unit. The strain sensor provided in the sensor unit detects such strain in the sensor unit. If relations between strains and loads are determined beforehand by means of a series of experiments and/or simulations, the load or the like acting on the vehicle wheel can be detected from an output of the strain sensor.

[Patent Document 1] JP Laid-open Patent Publication No. 2002-098138

[Patent Document 2] JP Published International Application No. 2003-530565

[Patent Document 3] JP Laid-open Patent Publication No. 2007-057299

According to the technique disclosed in the Patent Document 2 listed above, detection is made of the strain generated as a result of deformation occurring in the flange on the stationary ring. A problem has, however, been found that since slippage occurs between the flange surface and the knuckle surface in the event that a force exceeding a stationary frictional force acts, application of repeated load results in a hysteresis appearing in an output signal.

By way of example, in the event that the load acting in a certain direction relative to the wheel support bearing assembly increases, no slippage occurs at first between the stationary ring flange surface and the knuckle surface because the stationary frictional force is larger than the load, but in the event that it exceeds a certain magnitude, the stationary frictional force overcomes, resulting in slippage. When starting from this condition the load is reduced, such a hysteresis appears in the output signal. Once this hysteresis appears, the detecting resolution will be lowered.

Also, in the case where the strain gauge is pasted to the outer ring such as disclosed in the Patent Document 2 spura, a problem has been found in assemblability. In the sensor equipped wheel support bearing assembly disclosed in the Patent Document 3, supra, the amplitude of the output signal of the sensor unit tends to increase each time the rolling elements of the wheel support bearing assembly move past in the vicinity of an area of installation of the sensor unit. In other words, the output signal of the sensor unit comes to represent a periodic waveform that is affected by the rolling elements and, therefore, the load cannot be detected with high accuracy.

SUMMARY OF THE INVENTION

An object of the present invention is to provide a sensor equipped wheel support bearing assembly of a kind, in which the load acting on the wheel support bearing assembly and/or a tire tread surface can be accurately detected without being affected by the rolling elements.

The sensor equipped wheel support bearing assembly of the present invention is a wheel support bearing assembly for rotatably supporting a vehicle wheel relative to a vehicle body structure, which assembly includes an outer member having an inner periphery formed with a plurality of rows of rolling surfaces; an inner member having an outer periphery formed with rolling surfaces opposed to the rolling surface referred to above; a plurality of rows of rolling elements interposed between the respective opposed rolling surfaces defined in the outer and inner members; one or more load detecting sensor units provided in one of the outer and inner members, which serves as a stationary member, for detecting a load imposed on the wheel support bearing assembly, each sensor unit including a strain generating member having two or more contact fixing segments secured to the stationary member in contact therewith and two or more sensors fitted to the strain generating member for detecting a strain occurring in the strain generating member, the two or more contact fixing segments being so arranged as to occupy the same axial positions of an outer diametric surface of the stationary member and as to occupy respective positions spaced from each other in a circumferential direction; and a calculating section to calculate a load acting on the wheel support bearing assembly by the sum of respective outputs of the two or more sensors.

When the load acts in the wheel support bearing assembly or between the vehicle wheel tire and the road surface, deformation takes place also in the stationary member (for example, the outer member) of the wheel support bearing assembly due to application of such load, and the sensor units detect the load in reference to such deformation. Although the respective output signals of the two or more sensor units will be affected by the passage of the rolling elements so long as it is left as it stands, the calculating section calculates a force (a vertically acting load Fz, a load Fx which will become the drive force or the braking force, and an axially acting load Fy) acting in the wheel support bearing assembly and/or between the vehicle wheel and the road surface (tire tread surface) from the sum of the respective output signals of the sensors and, therefore, the influences brought about by the position of the rolling elements, which appear in the respective output signals of the two or more sensors can be counterbalanced. Also, since no low pass filter is needed, the response speed can be increased. Accordingly, without being affected by the rolling elements, and even at the time they are halted, the load (the vertically acting load Fz, the load Fx which will become the drive force or the braking force, and the axially acting load Fy) acting in the wheel support bearing assembly and/or between the vehicle wheel and the road surface can be detected with high accuracy.

In the present invention, two of the two or more contact fixing segments, which are positioned at respective ends in the circumferential direction may be spaced from each other in the circumferential direction a distance equal to the pitch of arrangement of the rolling elements. In the case of this construction, by arranging, for example, the two sensors at respective positions intermediate between the two contact fixing segments at the opposite ends referred to above, the interval between those sensors in the circumferential direction can be rendered to be about ½ of the pitch of arrangement of the rolling elements. As a result, the respective output signals of those sensors can have a phase difference of about 180°, the average value of which represents the one in which the influences brought about by the position of the rolling elements have been counterbalanced sufficiently. Accordingly, the force calculated by the calculating section and acting on the wheel support bearing assembly and/or between the vehicle wheel and the road surface represents an accurate value from which the influences brought about by the position of the rolling elements have been removed assuredly.

In the present invention, the neighboring two sensors out of the two or more sensors may be spaced from each other in the circumferential direction a distance equal or approximate to ½+n (n being an integer) of the pitch of arrangement of the rolling elements.

If the circumferential interval between the two sensors is equal to ½ of the pitch P of arrangement of the rolling elements, the respective output signals of those sensors will have a phase difference of 180°, the average value of which represents a value in which the influences brought about by the position of the rolling elements have been completely counterbalanced. Accordingly, the force calculated by the calculating section and acting on the wheel support bearing assembly and/or between the vehicle wheel and the road surface represents an accurate value from which the influences brought about by the position of the rolling elements have been removed assuredly.

In the present invention, each of the sensor units may include three contact fixing segments and two sensors, in which case those sensors are fitted between first and second contact fixing segments, which are neighboring to each other, and between the second and third contact fixing segments which are neighboring to each other.

In the case of this construction, if the circumference interval between the two contact fixing segments positioned at the opposite ends (the first and third contact fixing segments) is chosen to be equal to the pitch of arrangement of the rolling elements, the circumferential interval between the neighboring two sensors will be ½ of the pitch of arrangement of the rolling elements. Accordingly, the force calculated by the calculating section and acting on the wheel support bearing assembly and/or between the vehicle wheel and the road surface represents an accurate value from which the influences brought about by the position of the rolling elements have been removed assuredly.

In the present invention, the neighboring contact fixing segments or the neighboring sensors may be spaced from each other in the circumferential direction a distance equal or approximate to ½+n (n being an integer) of the pitch of arrangement of the rolling elements. Even in this construction, by the sum of the respective output signals of the sensors, the influences brought about by the position of the rolling elements can be removed.

In the present invention, the strain generating member may be in the form of a thin plate member having, when viewed from top, a schematic shape similar to the strip shape of a uniform width or similar to the strip shape with its opposite side edge portions formed with respective cutout portions.

Where the strain generating member is constituted by the thin plate having, when viewed from top, a schematic shape similar to the strip shape of a uniform width, the strain generating member can be made compact and at low cost.

In the present invention, the sensor units may be arranged at top, bottom, right and left surface portions of the outer diametric surface of the outer member, which assume top, bottom, front and rear positions, respectively, relative to the tire tread surface. In the case of this construction, a plurality of loads can be calculated. In other words, the vertically acting load Fz and the axially acting load Fy can be calculated from the respective output signals of the two sensor units arranged at the top and bottom surface portions of the outer diametric surface of the stationary member, respectively, and the load Fx resulting from the drive force or the braking force can be calculated from the respective output signals of the two sensor units arranged at the left and right surface portions of the outer diametric surface of the stationary member.

In the present invention, each of the sensor units may include three contact fixing segments and two sensors and the neighboring contact fixing segments or the neighboring sensors are spaced from each other in the circumferential direction a distance equal or approximate to ½+n (n being an integer) of the pitch of arrangement of the rolling elements.

According to this construction, since by the sum of the respective output signals of the two sensors, even at the time of halt, the influences brought about by the position of the rolling elements can be counterbalanced, the load acting in the wheel support bearing assembly or between the vehicle wheel tire and the road surface can be accurately detected without being affected by the rolling elements.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

REFERENCE NUMERALS

1: Outer member
2: Inner member
3, 4: Rolling surface
5: Rolling element
6: Retainer
20: Sensor unit
21: Strain generating member
21a: Contact fixing segment
21b: Cutout portion
22A, 22B: Strain sensor
30: Calculating section

BEST MODE FOR CARRYING OUT THE INVENTION

A first embodiment of the present invention will be hereinafter described in detail with particular reference to FIGS. 1 to 9A to 9C. This first embodiment is directed to an inner ring rotating model of a third generation type and is applied to a wheel support bearing assembly for the support of a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
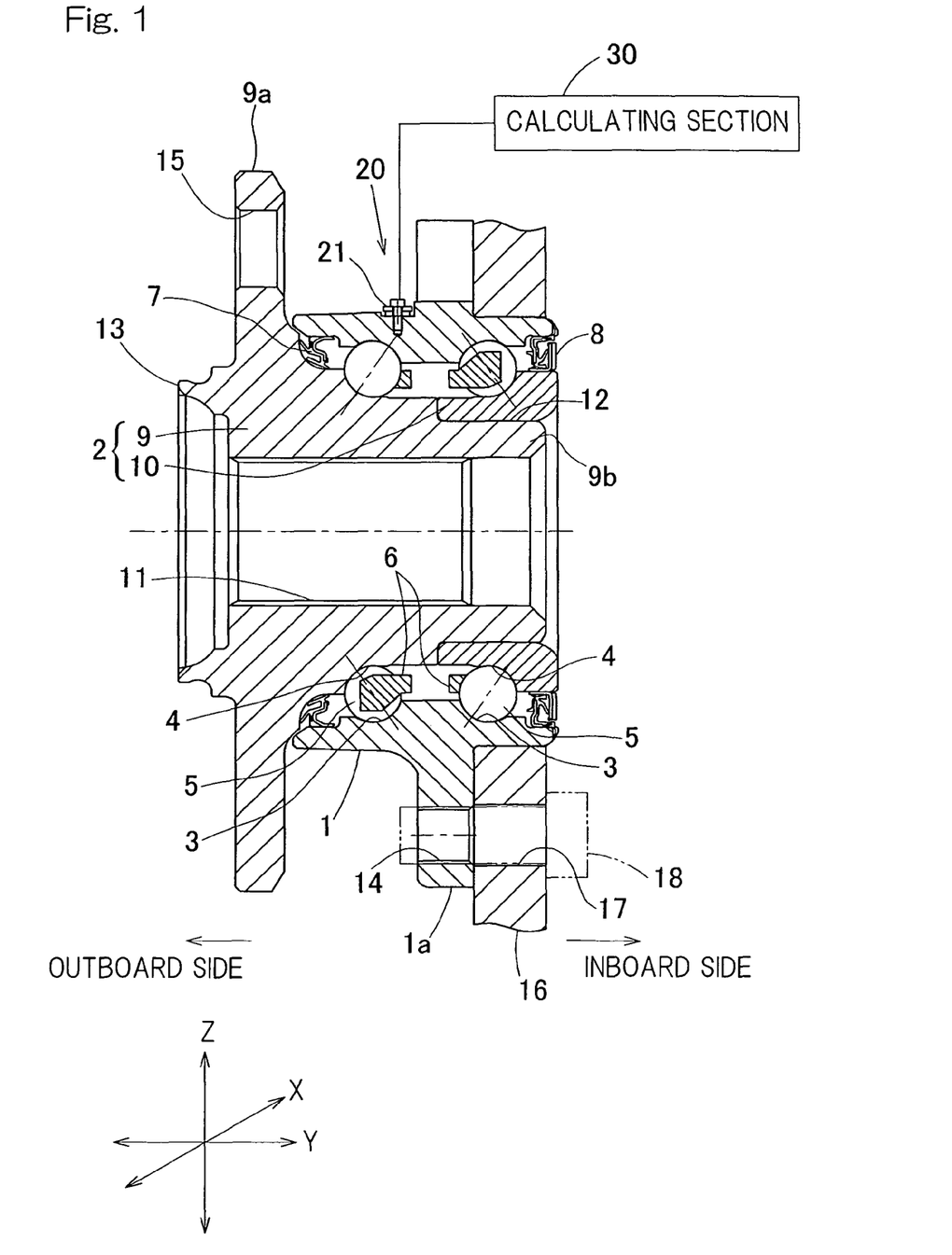
FIG. 1 is a diagram including a sectional view of a sensor equipped wheel support bearing assembly according to a first preferred embodiment of the present invention and a block diagram of a conceptual construction of a detecting system therefor.

A bearing unit in this wheel support bearing assembly includes, as shown in FIG. 1 in a sectional view, an outer member 1 having an inner periphery formed with a plurality of rolling surfaces 3, an inner member 2 having an outer periphery formed with rolling surfaces 4 in face-to-face relation with the respective rolling surfaces 3, and a plurality of rows of rolling elements 5 interposed between the plurality of those rolling surfaces 3 and 4. This wheel support bearing assembly is rendered to be a double row angular contact ball bearing design, in which the rolling elements 5 are employed in the form of balls and retained by a retainer 6 employed for each of the rows. The rolling surfaces 3 and 4 referred to above have a sectional shape representing an arcuate shape and are so formed as to permit the ball contact angles to assume a back-to-back relation to each other. Opposite ends of a bearing space delimited between the outer member 1 and the inner member 2 are sealed respectively by sealing devices 7 and 8.

The outer member 1 is of a type that serves as a stationary member and is of one piece construction including a vehicle body fitting flange 1a defined in an outer periphery thereof and adapted to be secured to a knuckle 16 of a suspension system (not shown) of an automotive vehicle. The vehicle body fitting flange 1a has knuckle fitting bolt holes 14 defined therein at a plurality of locations spaced in a direction circumferentially thereof and, therefore, the vehicle body fitting flange 1a can be secured to the knuckle 16 when knuckle bolts 18 inserted from an inboard side into respective bolt insertion holes 17 defined in the knuckle 16 are threaded into the corresponding bolt holes 14.

The inner member 2 is of a type that serves as a rotating member and includes a hub unit 9 having a wheel mounting hub flange 9a formed therein, and an inner ring 10 mounted on an outer periphery of an inboard end of a hub unit 9b of the hub unit 9. The rolling surfaces 4 referred to above are formed respectively in the hub unit 9 and the inner ring 10. An outer periphery of an inboard end of the hub unit 9 is provided with an inner ring mounting surface 12 that is stepped radially inwardly to render it to have a reduced diameter, with the inner ring 10 mounted on this inner ring mounting surface 12. The hub unit 9 has a center portion formed with a throughhole 11 extending completely therethrough. The hub flange 9a is provided with a plurality of press fitting holes 15 defined at respective circumferential locations, spaced in a direction circumferentially thereof, for receiving corresponding hub bolts (not shown). In a periphery of a root portion of the hub flange 9a of the hub unit 9, a cylindrical pilot portion 13 for guiding a vehicle wheel and a brake component protrudes (not shown) towards the outboard side.

Figure 2:
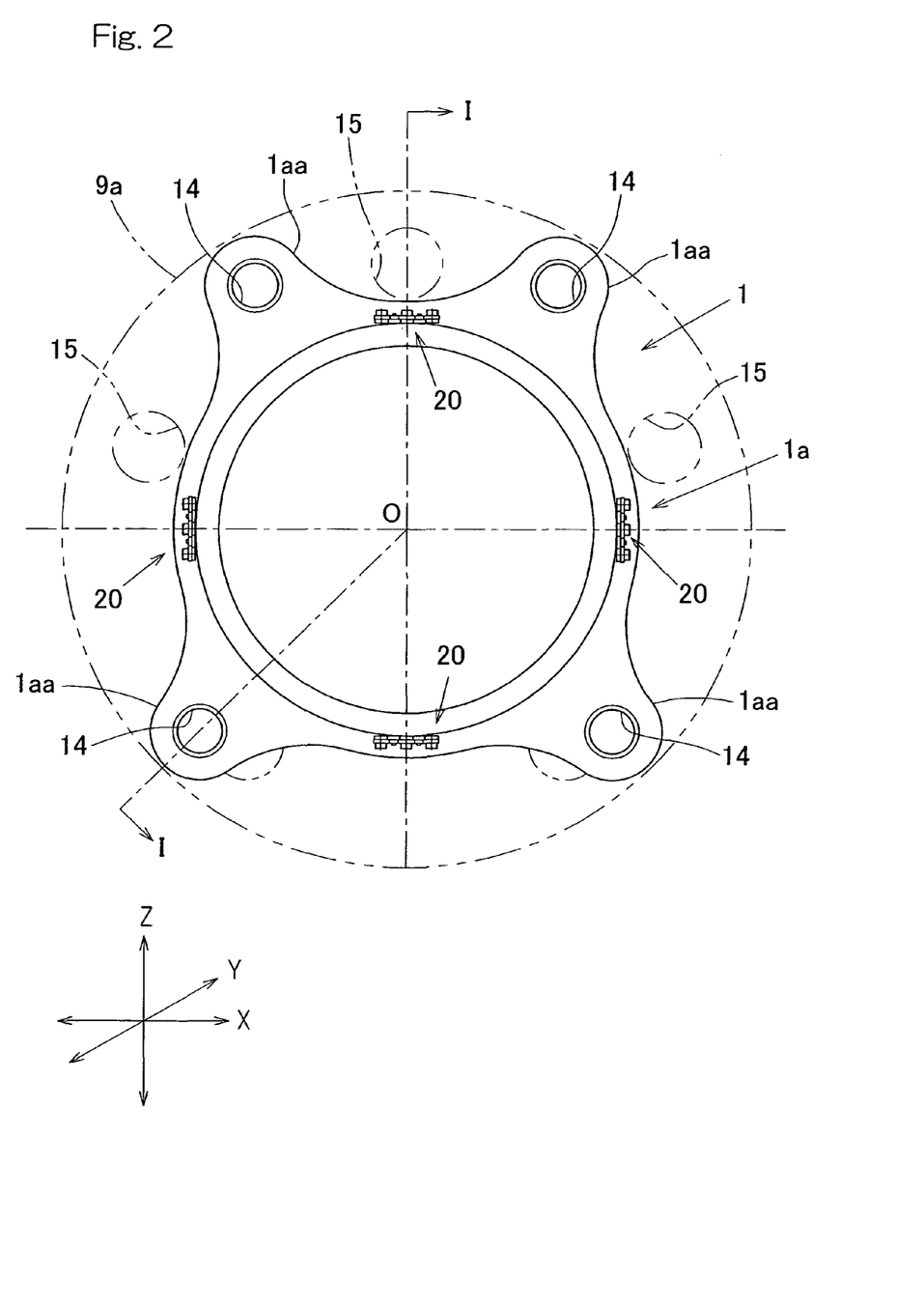
FIG. 2 is a front elevational view showing an outer member of the sensor equipped wheel support bearing assembly as viewed from the outboard side.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. As best shown in FIG. 2, the vehicle body fitting flange 1a referred to previously has projecting pieces 1aa at respective circumferential locations where the corresponding bolt holes 14 are defined, which protrude in a direction radially outwardly beyond the remaining area.

An outer diametric surface of the outer member 1, which serves as the stationary member, is provided with four sensor units 20. In the illustrated embodiment, those sensor units 20 are provides respectively at top, bottom, right and left surface portions of the outer diametric surface of the outer member 1, which assume top, bottom, front and rear positions, respectively, relative to the tire tread surface.

Figure 3:
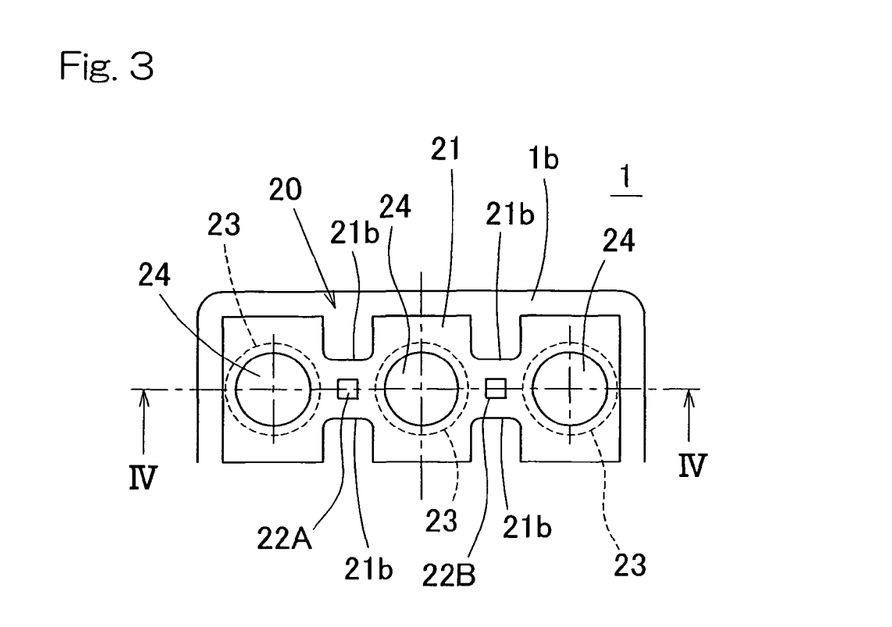
FIG. 3 is an enlarged top plan view showing a sensor unit employed in the sensor equipped wheel support bearing assembly.
Figure 4:
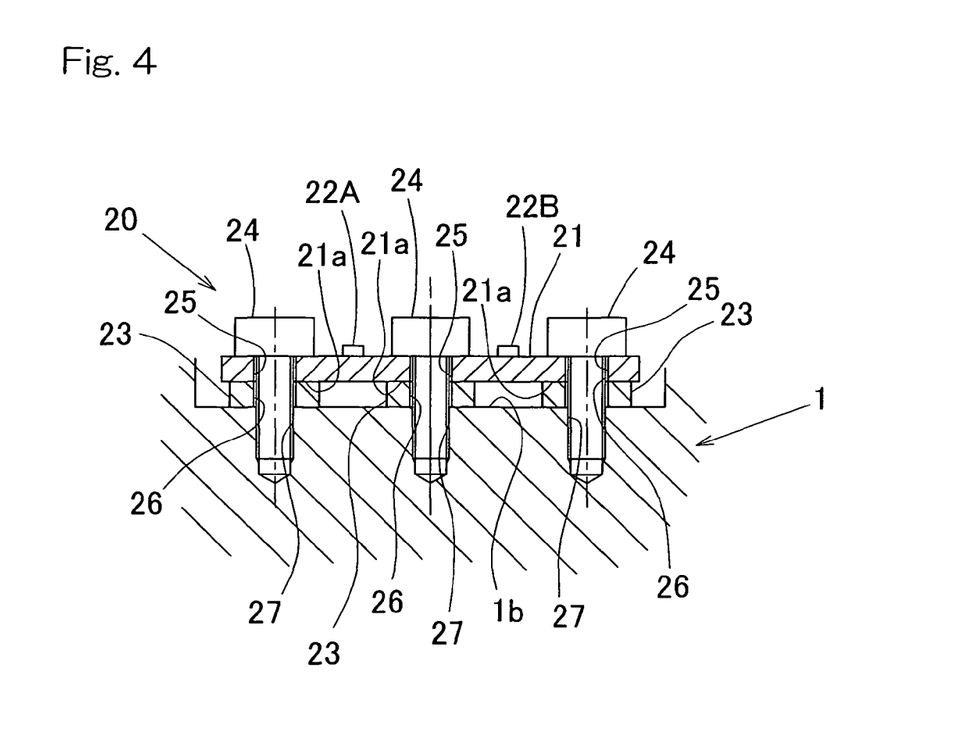
FIG. 4 is a cross sectional view taken along the line IV-IV in FIG. 3.

Each of those sensor units 20 is, as best shown in FIGS. 3 and 4 in an enlarged top plan view and an enlarged sectional view, respectively, made up of a strain generating member 21 and two or more (for example, two, in the illustrated instance) sensors 22 mounted on the strain generating member 21 for detecting a strain occurring in the strain generating member 21. The strain generating member 21 is prepared from a thin metal sheet capable of undergoing an elastic deformation, such as, for example, a steel sheet having a thickness equal to or smaller than 3 mm. The strain generating member 21 represents a generally strip shape, in a plane view, of a constant width, and has cutout portions 21b defined in opposite side edges thereof at a location intermediate of the length of the strain generating member 21. Each of the cutout portions 21b has corner areas of an arcuately sectioned shape.

Also, the strain generating member 21 has two or more (for example, three, in the illustrated instance) contact fixing segments 21a that are secured to the outer diametric surface of the outer member through respective spacers 23 in contact with such outer diametric surface of the outer member 1. The three contact fixing segments 21a are arranged in a row in a direction lengthwise of the strain generating member 21. The two strain sensors 22 are pasted to respective portions of the strain generating member 21 where the strains are large relative to the load acting in various directions. More specifically, the strain sensors 22 are arranged between the neighboring contact fixing segments 21a adjacent an outer surface of the strain generating member 21. In other words, referring to FIG. 4, one 22A of the strain sensors is arranged between the left contact fixing segment 21a and the intermediate contact fixing segment 21a and the other 22B of the strain sensors is arranged between the intermediate contact fixing segment 21a and the right contact fixing segment 21a.

As shown in FIG. 3, the cutout portion 21b is formed in at two locations in each of the opposite side edges of the strain generating member 21, which correspond respectively to locations at which the strain sensors 22 are disposed. Accordingly, the strain sensors 22 detects respective strains occurring in the longitudinal direction at portions of the strain generating member 21 in the vicinity of the cutout portions 21b.

It is to be noted that the strain generating member 21 is preferably of a kind unable to undergo a plastic deformation even in a condition, in which as an external force acting on the outer member 1, which is the stationary member, or a working force acting between the vehicle tire and the road surface, the maximum expected force is applied. Once such a plastic deformation occurs, the deformation of the outer member 1 will not be transmitted accurately to the sensor unit 20 and, therefore, measurement of the strain will be adversely affected.

The sensor unit 20 referred to previously is of such a design, in which the two contact fixing segments 21a of the strain generating member 21 employed therein are arranged on the outer diametric surface of the outer member 1 so as to occupy respective positions of the same size in the axial direction, which are spaced from each other in a circumferential direction of the outer member 1, and those contact fixing segments 21a so positioned are fixed to the outer diametric surface of the outer member 1 through respective spacers 23 by means of associated bolts 24. Each of the bolts 24 referred to above is threaded into a corresponding bolt hole 27, defined in an outer peripheral portion of the outer member 1, after having been passed through a respective bolt insertion hole 25, defined in each of the contact fixing segments 21a so as to extend radially, and then through a bolt insertion hole 26 defined in the associated spacer 23.

When the contact fixing segments 21a are fixed to the outer diametric surface of the outer member 1 through the respective spacers 3, the intermediate portion of the strain generating member 21 in the form of a thin plate member, in which the cutout portions 21b are formed, can be kept spaced from the outer diametric surface of the outer member 1 and, accordingly, a strain deformation occurs easily in a periphery of the cutout portions 21b. For axial position of the contact fixing segments 21a, axial position in a periphery of the rolling surface 3 on the outboard side in the outer member 1 is chosen in the instance as shown. The periphery of the rolling surface 3 on the outboard side referred to above means a region ranging from an middle position between the rolling surfaces 3 on the inboard side and outboard side to an area in which the rolling surface 3 on the outboard is formed. In order for the sensor unit 20 to be stably fixed to the outer diametric surface of the outer member 1, an area of the outer diametric surface of the outer member 1, on which the respective spacer 23 is fixed in contact therewith, is formed as a flat area 1b.

Other than that described above, and as best shown in FIG. 5 in a sectional representation, a groove 1c has to be defined in a portion of the outer diametric surface of the outer member 1 intermediate of the neighboring locations, at which the associated contact fixing segments 21a of the strain generating member 21 are to be fixed, so that the use of the spacers 23 can be dispensed with and those portions of the strain generating member 21 each intermediate between the neighboring contact fixing segments 21a, where the cutout portions 21b occupy, can be spaced from the outer diametric surface of the outer member 1.

For the sensor 22, any of various sensors may be employed. For example, the sensor 22 can be constructed in the form of a metal foil strain gauge. In such case, it is fixed to the strain generating member 21 by means of bonding. Also, the strain sensor 22 may be employed in the form of a thick film resistance element formed on the strain generating member 21.

The two strain sensors 22 employed in each of the sensor units 20 are connected with a calculating section 30. The calculating section 30 is a circuit operable to calculate the force (the vertically acting load Fz, the load Fx which will become a drive force or a braking force, and/or the axially acting load Fy) acting in the wheel support bearing assembly or between the vehicle wheel and the road surface (the tire tread surface) from the sum of respective output signals of the two sensors 22 in each of the sensor units 20. This calculating section 30 has a relation setting module (not shown), in which relations between the working force (vertically acting load Fz, the load Fx which will become the drive force or the braking force, and the axially acting load Fy) and the sum of the respective output signals of the two strain sensors 22 are set in an arithmetic equation or table. The calculating section 30 calculates the working force (the vertically acting load Fz, the load Fx which will become the drive force or the braking force, the axially acting load Fy) with the use of the relation setting module, from the sum of respective output signals of the strain sensors 22. Contents set in the relation setting module referred to above are predetermined and set by means of a series of experiments and/or simulations.

Figure 6A:
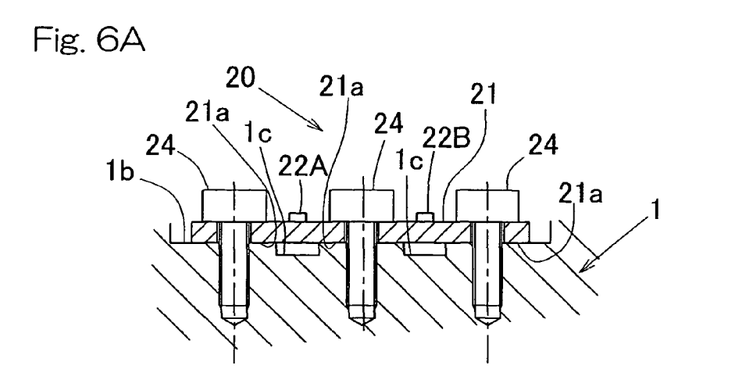
FIGS. 6A to 6C are explanatory diagrams showing a manner of how revolution of rolling elements affect on an output signal from the sensor unit, respectively.
Figure 6B:
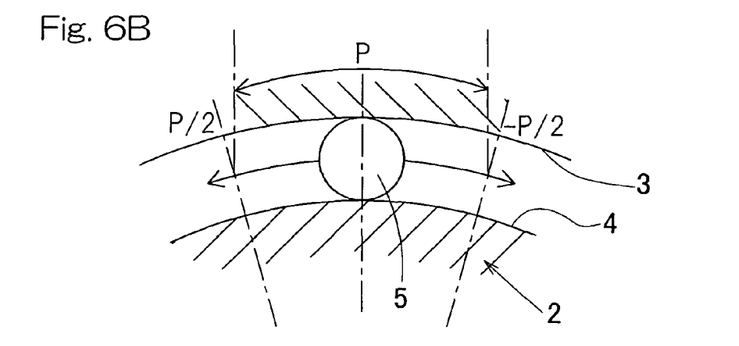
Figure 6C:
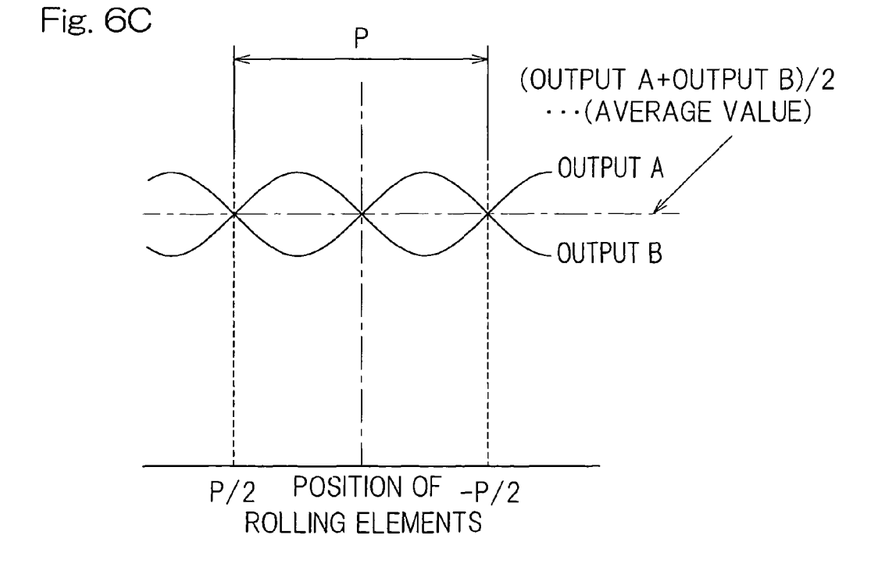

Since the sensor unit 20 is provided at the axial position which will become the perimeter of the outboard row of the rolling surface 3 in the outer member 1, the respective output signals A and B of the strain sensors 22A and 22B are affected by the rolling elements 5 then moving past in the vicinity of an area of installation of the sensor unit 20 as shown in FIGS. 6A to 6C. Also, even at the time the bearing unit is halted, the respective output signals A and B of the strain sensors 22A and 22B are affected by the position of the rolling elements 5. In other words, when the rolling elements 5 move past the position nearest to the strain sensors 22A and 22B in the sensor unit 20 (or, when the rolling elements 5 are located at such position), the amplitude of each of the respective output signals A and B of the strain sensors 22A and 22B attains a peak value, but will decrease as the rolling elements 5 move away from that nearest position (or, when the rolling elements are located at a different position away from such position) as shown in FIGS. 6A and 6B. Since, during the rotation of the bearing unit, the rolling elements 5 successively move past in the vicinity of the area of installation of the sensor unit 20 at a predetermined arrangement pitch P, the respective output signals A and B of the strain sensors 22A and 22B exhibits a waveform similar to the sinusoidal wave in which the amplitude of each of those output signals A and B of the strain sensors 22A and 22B periodically changes, as shown by the solid line in FIG. 6C, at the period of the pitch P of arrangement of the rolling elements 5.

According to the foregoing embodiment, the calculating section 30 calculates the force (the vertically acting load Fz, the load Fx which will become a drive force or a braking force, and/or the axially acting load Fy) acting in the wheel support bearing assembly or between the vehicle wheel and the road surface (the tire tread surface) from the sum of respective output signals of the two sensors 22A and 22B and, therefore, influences brought about on the respective output signals A and B of those two strain sensors 22A and 22B by the position of the rolling elements 5 can be counterbalanced. As a result, the load acting on the wheel support bearing assembly or the tire tread surface can be accurately detected.

Figure 5:
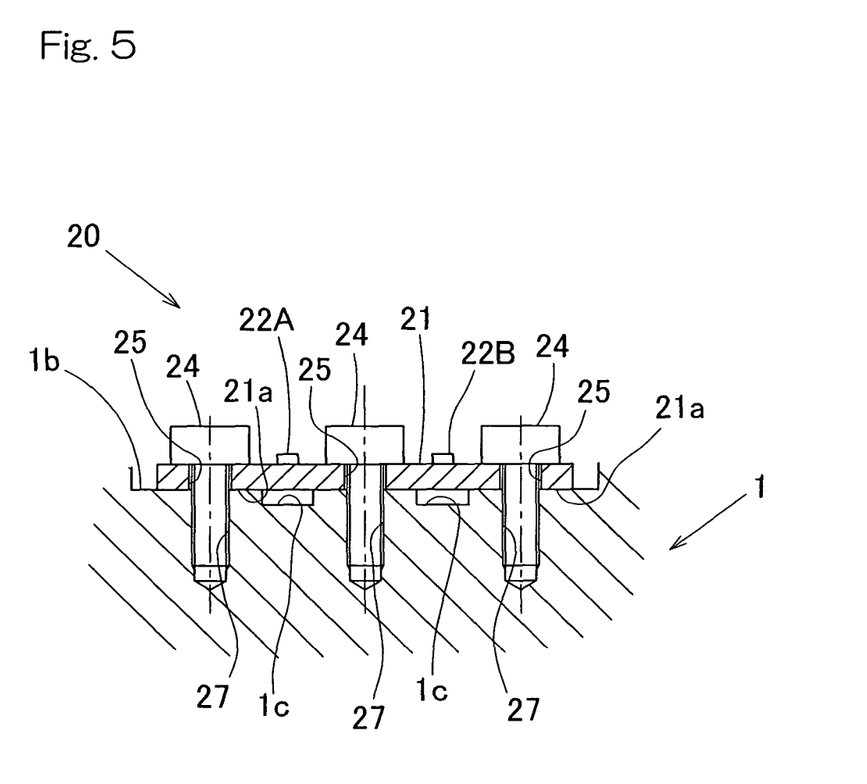
FIG. 5 is a sectional view showing a different example of disposition of the sensor unit.

In FIGS. 6A to 6C showing the sensor units 20 having the structure described in reference to FIG. 5, of the three contact fixing segments 21a arranged in a direction circumferential of the outer diametric surface of the outer member 1 serving as the stationary member, the two contact fixing segments 21a positioned at respective ends of the arrangement of the three contact fixing segments 21a are spaced from each other a distance equal to the pitch P of arrangement of the rolling elements 5. In such case, the circumferential interval between the two strain sensors 22A and 22B, which are arranged at respective intermediate positions between the neighboring contact fixing segments 21a, is about ½ of the pitch P of arrangement of the rolling elements 5.

As a result, the respective output signals A and B of the two strain sensors 22A and 22B have a phase difference of about 180°, the average value, (A+B)/2, of which is the value in which the influences brought about by the position of the rolling elements 5 are sufficiently counterbalanced as shown by the chain line in FIG. 6C. Accordingly, from the sum of the respective output signals A and B of the two strain sensors 22A and 22B, the force (the vertically acting load Fz, the load Fx which will become a drive force or a braking force, and/or the axially acting load Fy) acting in the wheel support bearing assembly or between the vehicle wheel and the road surface (the tire tread surface), which has been calculated by the calculating section 30, will be the accurate one from which the influences brought about by the position of the rolling elements 5 have been assuredly removed.

Figure 7A:
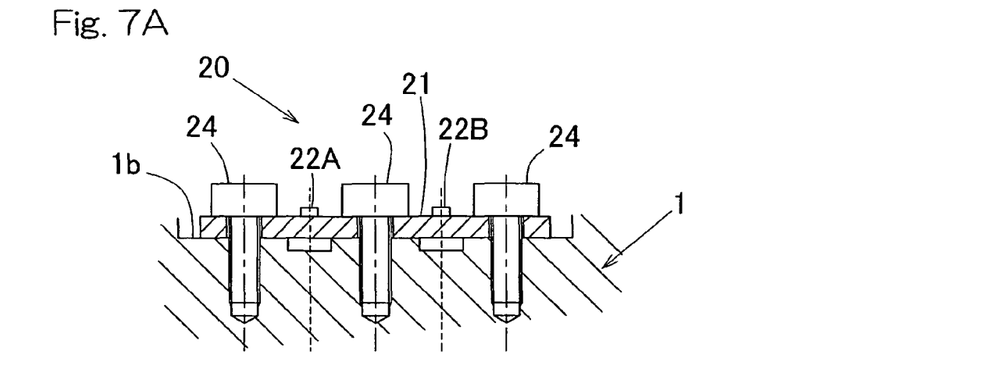
FIGS. 7A to 7C are explanatory diagrams showing another manner of how revolution of rolling elements affect on an output signal from the sensor unit.
Figure 7B:
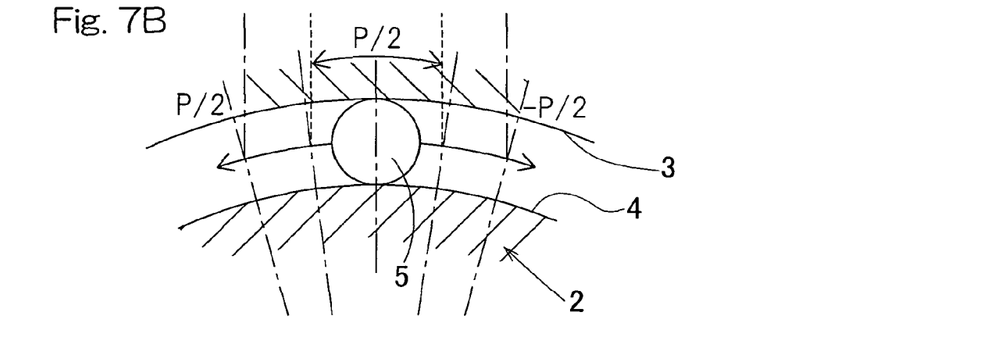
Figure 7C:
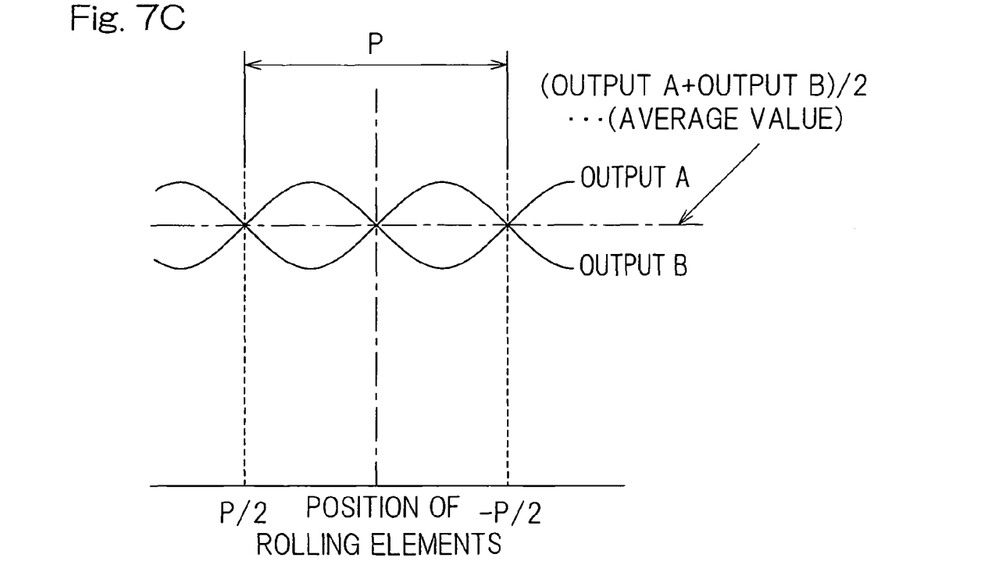

FIGS. 7A to 7C illustrate the example, in which in the sensor unit 20 of the structure shown in and described with particular reference to FIG. 5, the circumferential interval between the two strain sensors 22A and 22B is chosen to be ½ of the pitch P of arrangement of the rolling elements 5. In this example, since the circumferential interval between the two strain sensors 22A and 22B is rendered to be ½ of the pitch P of arrangement of the rolling elements 5, the respective output signals A and B of those two strain sensors 22A and 22B will have a phase difference of 180°, the average value, (A+B)/2, of which is the value in which the influences brought about by the position of the rolling elements 5 are sufficiently counterbalanced as shown by the chain line in FIG. 7C. Accordingly, the force (the vertically acting load Fz, the load Fx which will become a drive force or a braking force, and/or the axially acting load Fy) acting in the wheel support bearing assembly or between the vehicle wheel and the road surface (the tire tread surface), which has been calculated by the calculating section 30, will be the accurate one from which the influences brought about by the position of the rolling elements 5 have been further assuredly removed.

It is to be noted that in such case, the circumferential interval between the two strain sensors 22A and 22B may be chosen to be ½+n (n being an integer) of the pitch P of arrangement of the rolling elements 5 ((½+n)·P) or a value approximate thereto. Even in this case, the average value (A+B)/2 of the respective output signals A and B of those two strain sensors 22A and 22B will represent the value in which the influences brought about by the position of the rolling elements 5 have been counterbalanced.

Figure 8A:
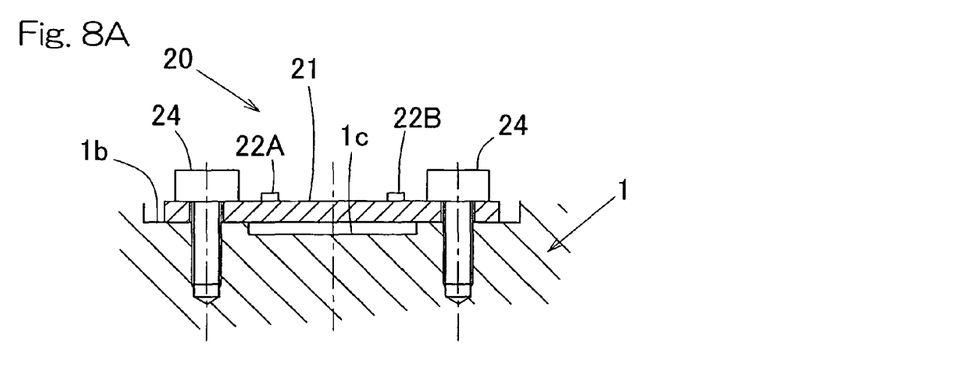
FIGS. 8A to 8C are explanatory diagrams showing a further manner of how revolution of rolling elements affect on an output signal from the sensor unit.
Figure 8B:
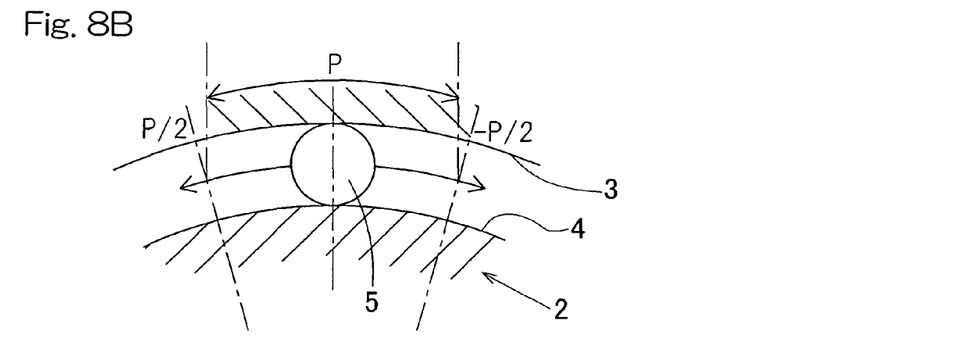
Figure 8C:
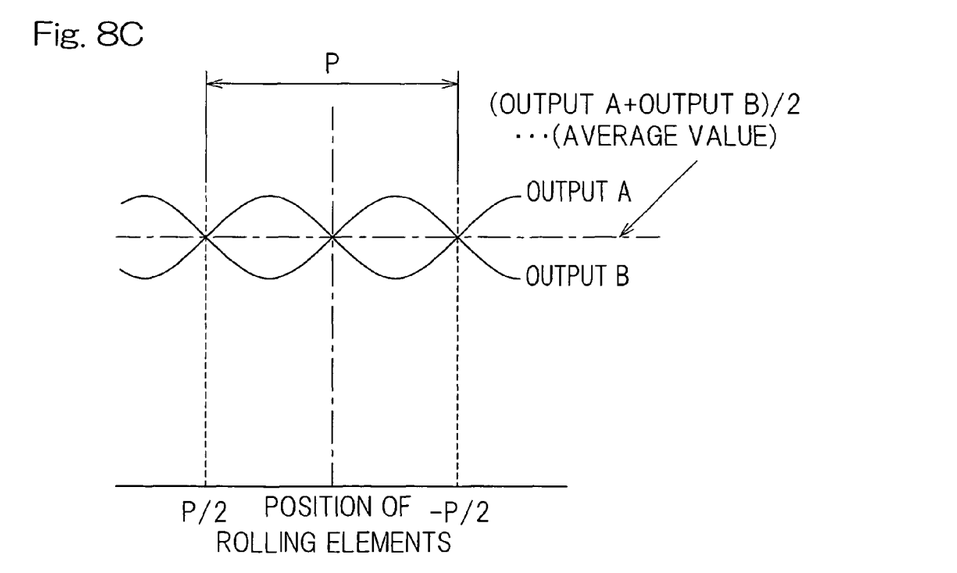

FIGS. 8A to 8C illustrate the example, in which in the sensor unit 20 of the structure shown in and described with particular reference to FIG. 5, the contact fixing segment 21a at the intermediate position is dispensed with, leaving only the two contact fixing segments 21a as shown in FIG. 8A. In this example, in a manner similar to the example shown in and described with reference to FIGS. 6A to 6C, the interval between the two contact fixing segments 21a is chosen to be equal to the pitch P of arrangement of the rolling elements 5. The circumferential interval between the two strain sensors 22A and 22B, which are disposed between the two contact fixing segments 21a, is rendered to be about ½ of the pitch P of arrangement of the rolling elements 5.

As a result, the respective output signals A and B of the two strain sensors 22A and 22B have a phase difference of about 180°, the average value, (A+B)/2, of which is the value in which the influences brought about by the position of the rolling elements 5 are sufficiently counterbalanced as shown by the chain line in FIG. 8C. Accordingly, the force (the vertically acting load Fz, the load Fx which will become a drive force or a braking force, and/or the axially acting load Fy) acting in the wheel support bearing assembly or between the vehicle wheel and the road surface (the tire tread surface), which has been calculated by the calculating section 30 from the sum of the respective output signals A and B of the two strain sensors 22A and 22B, will be the accurate one from which the influences brought about by the position of the rolling elements 5 have been assuredly removed.

Figure 9A:
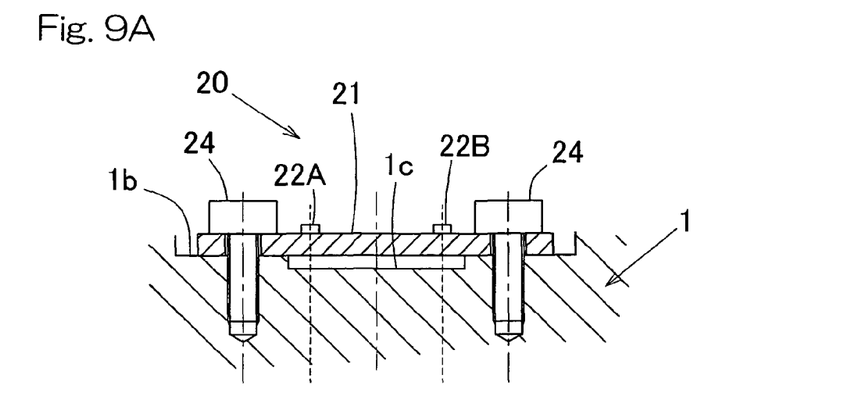
FIGS. 9A to 9C are explanatory diagrams showing a different manner how revolution of rolling elements affect on an output signal from the sensor unit.
Figure 9B:
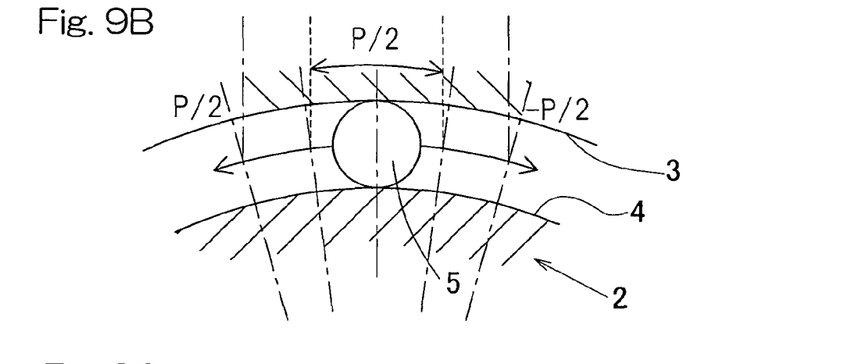
Figure 9C:
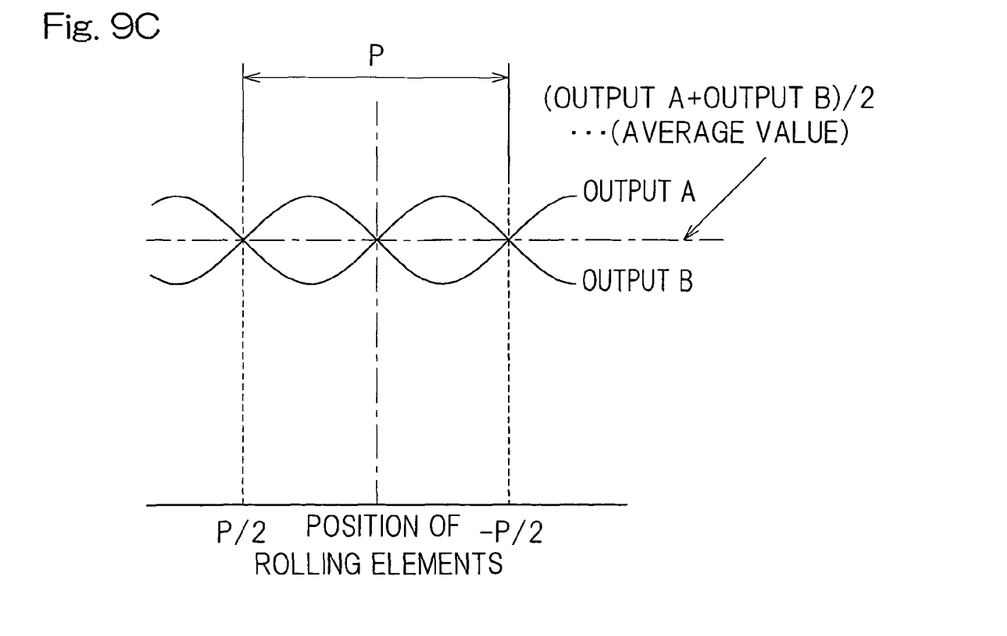

FIGS. 9A to 9C illustrate the example, in which in the sensor unit 20 of the structure shown in and described with particular reference to FIG. 8A, the circumferential interval between the two strain sensors 22A and 22B is chosen to be ½ of the pitch P of arrangement of the rolling elements 5. Even in this example, in a manner similar to the example shown in and described with reference to FIG. 7A to 7C, the respective output signals A and B of the two strain sensors 22A and 22B have a phase difference of about 180°, the average value, (A+B)/2, of which is the value in which the influences brought about by the position of the rolling elements 5 are completely counterbalanced as shown by the chain line in FIG. 9C. Accordingly, the force (the vertically acting load Fz, the load Fx which will become a drive force or a braking force, and/or the axially acting load Fy) acting in the wheel support bearing assembly or between the vehicle wheel and the road surface (the tire tread surface), which has been calculated by the calculating section 30, will be the accurate one from which the influences brought about by the position of the rolling elements 5 have been further assuredly removed.

In this case, the circumferential interval between the two strain sensors 22A and 22B may be chosen to be ½+n (n being an integer) of the pitch P of arrangement of the rolling elements 5 ((½+n)·P) or a value approximate thereto. Even in this case, the average value (A+B)/2 of the respective output signals A and B of those two strain sensors 22A and 22B will represent the value in which the influences brought about by the position of the rolling elements 5 have been counterbalanced.

Other than those, in each of the respective examples shown in FIGS. 6A to 6C and FIGS. 7A to 7C, the circumferential interval between the two strain sensors 22A and 22B may be chosen to be ½+n (n being an integer) of the pitch P of arrangement of the rolling elements 5 or a value approximate thereto.

When the load acts in the wheel support bearing assembly or between the vehicle wheel tire and the road surface, such load is also applied to the outer member 1, which serves as the stationary member of the wheel support bearing assembly, resulting in deformation. Since the contact fixing segments 21a of the strain generating member 21, having the cutout portions 21b, in each of the sensor units 20 are fixed to the outer member 1 in contact therewith, the strain appearing in the outer member 1 is, after having been amplified, transmitted to the strain generating member 21 and such strain is subsequently detected by the strain sensors 22A and 22B with high sensitivity, wherefore the load can be calculated from such output signals. In the instance as shown and described above, the vertically acting load Fz and the axially acting load Fy can be calculated from the respective output signals of the two sensor units 20 arranged on the top and bottom surface areas of the outer diametric surface of the outer member 1 and the load Fx brought about by the drive force or the braking force can be calculated from the respective output signals from the two sensor units 20 arranged on the left and right surface areas of the outer diametric surface of the outer member 1.

In such case, the output signals A and B of the strain sensors 22A and 22B in each of the sensor units 20 will be affected by the passage of the rolling elements 5 so long as it is left as it stands. But since the calculating section 30 calculates the loads (the vertically acting load Fz, the load Fx which will become the drive force or the braking force, and the axially acting load Fy), acting in the wheel support bearing assembly and between the vehicle wheel tire and the road surface, from the sum of those two output signals A and B, the influences brought about by the position of the rolling elements 5 can be removed regardless of whether the bearing unit is being rotated or whether it is halted, resulting in an accurate detection of the load. Also, since no low pass filter is needed, the response speed can be increased.

If the contact fixing segments 21a of the sensor units 20, which are secured to the outer diametric surface of the outer member 1 serving as the stationary member, have respective axial dimensions different from each other, the strains transmitted from the outer diametric surface of the outer member 1 to the strain generating members 21 through the contact fixing segments 21a differ from each other. In the embodiment hereinbefore described, since the contact fixing segments 21a are so provided as to have the same dimensions in the axial direction, concentration of strains on the strain generating members 21 can be facilitated and the detecting sensitivity can be correspondingly increased.

Also, since in the embodiment hereinabove described, the strain generating member 21 in each of the sensor units 20 is employed in the form of a thin plate member having, when viewed from top, a schematic shape similar to the strip shape of a uniform width or similar to the strip shape with its opposite side edge portions formed with the respective cutout portions 21b, the strain appearing in the outer member 1 can be easily transmitted to the strain generating member 21 after having been amplified and can then be detected by the strain sensors 22A and 22B with high sensitivity. As a result, the hysteresis tending to appear in the output signals A and B can therefore be suppressed, allowing the load to be calculated with high sensitivity. Also, the shape of the strain generating member 21 can be simplified to allow it to be compact in size and low in cost.

Also, since each of the cutout portions 21b defined in the strain generating member 21 has its corner area so shaped as to represent the arcuately sectioned shape as hereinbefore described, the strain will not be concentrated on those corner areas of the cutout portions 21b, thereby minimizing the possibility of the plastic deformation taking place. In addition, since no strain concentrates on the corner areas of the cutout portions 21b as hereinabove described, variation in distribution of the strain at a portion of the strain generating member 21, to which a detector, that is, the strain sensors 22A and 22B are fitted, can be minimized. Therefore, the influences brought about by the mounting position of the strain sensors 22A and 22B on the respective output signals A and B of the strain sensors 22A and 22B can be minimized. In this way, the load can be calculated with further high accuracy.

When the detected load obtained from the sensor equipped wheel support bearing assembly of the construction described hereinbefore is used in vehicle control in the automotive vehicle, contribution can be made to the stabilized travel of the automotive vehicle. Also, when this sensor equipped wheel support bearing assembly is used, the load sensor can be snugly and neatly installed in the automotive vehicle, resulting in the excellent productivity with the cost reduced.

In the embodiment hereinbefore described, those peripheral portions of the vehicle body fitting flange 1a of the outer member 1, where the bolt holes 14 for connection with the knuckle are defined, have been shown and described as forming the protruding lugs 1aa disposed at the plurality of the circumferential locations of the vehicle body fitting flange 1a and extending radially outwardly beyond the remaining portion of the vehicle body fitting flange 1a. With this construction, since the contact fixing segments 21a of the strain generating member 21 in each of the sensor units 20 are positioned intermediate between the neighboring protruding lugs 1aa, the strain generating member 21 can be arranged at a position spaced from the protruding lugs 1aa, which constitute a cause of the hysteresis. Therefore, the hysteresis appearing in the output signals A and B of the strain sensors 22A and 22B can be correspondingly suppressed, resulting in calculation of the load with high accuracy.

Also, in the embodiment hereinbefore described, the sensor units 20 are arranged at the axial positions, which will become the perimeter of one of the rolling surfaces 3 in the outer member 1, that is positioned in the outboard row, that is, at the site where a relatively large space for installation is available and the amount of deformation due to transmission of the tire working force to the outer member 1 through the rolling elements 5 is large. Accordingly, the detecting sensitivity can be increased to allow the load to be calculated with high accuracy.

In addition, since in the embodiment hereinbefore described, the sensor units 20 are provided respectively at the top, bottom, left and right surface areas of the outer diametric surface of the outer member 1 which serves as the stationary member, the load can be calculated with high accuracy under any loading condition. In other words, since if the load acting in a certain direction increases, a portion where the rolling elements 5 contact the rolling surface 3 and a portion where the rolling elements 5 do not contact the rolling surface 3 appear at a 180° phase difference, positioning of the sensor units 20 in that certain direction at the 180° phase difference is effective to allow the load, which is applied to the outer member 1 through the rolling elements 5, to be transmitted inevitably to either one of the sensor units 20 and, therefore, such load can be detected by the strain sensors 22A and 22B.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A sensor equipped wheel support bearing assembly for rotatably supporting a vehicle wheel relative to a vehicle body structure, comprising:

an outer member having an inner periphery formed with a plurality of rows of rolling surfaces;

an inner member having an outer periphery formed with rolling surfaces opposed to the rolling surface referred to above;

a plurality of rows of rolling elements interposed between the respective opposed rolling surfaces defined in the outer and inner members;

one or more load detecting sensor units provided in one of the outer and inner members, which serves as a stationary member, for detecting a load imposed on the wheel support bearing assembly, each sensor unit including a strain generating member, having two or more contact fixing segments secured to the stationary member in contact therewith, and two or more sensors fitted to the strain generating member for detecting a strain occurring in the strain generating member, the two or more contact fixing segments being so arranged as to occupy the same axial positions of an outer diametric surface of the stationary member and as to occupy respective positions spaced from each other in a circumferential direction; and a calculating section to calculate a load acting on the wheel support bearing assembly by the sum of respective outputs of the two or more sensors, wherein two of the two or more contact fixing segments, which are positioned at respective ends in the circumferential direction, are spaced from each other in the circumferential direction a distance equal to the pitch of arrangement of the rolling elements, the pitch of arrangement of the rolling elements being a distance between centers of the rolling elements as arranged between the rolling surfaces.

2. A sensor equipped wheel support bearing assembly for rotatably supporting a vehicle wheel relative to a vehicle body structure, comprising:

an outer member having an inner periphery formed with a plurality of rows of rolling surfaces;

an inner member having an outer periphery formed with rolling surfaces opposed to the rolling surface referred to above;

a plurality of rows of rolling elements interposed between the respective opposed rolling surfaces defined in the outer and inner members;

one or more load detecting sensor units provided in one of the outer and inner members, which serves as a stationary member, for detecting a load imposed on the wheel support bearing assembly, each sensor unit including a strain generating member, having two or more contact fixing segments secured to the stationary member in contact therewith, and two or more sensors fitted to the strain generating member for detecting a strain occurring in the strain generating member, the two or more contact fixing segments being so arranged as to occupy the same axial positions of an outer diametric surface of the stationary member and as to occupy respective positions spaced from each other in a circumferential direction; and a calculating section to calculate a load acting on the wheel support bearing assembly by the sum of respective outputs of the two or more sensors, in which adjacent sensors out of the two or more sensors are spaced from each other in the circumferential direction a distance equal to $\frac{1}{2}+n$, where n is an integer, of the pitch of arrangement of the rolling elements, the pitch of arrangement of the rolling elements being a distance between centers of the rolling elements as arranged between the rolling surfaces.

3. The sensor equipped wheel support bearing assembly as claimed in claim 1, in which each of the sensor units includes three contact fixing segments and two sensors and those sensors are fitted between first and second contact fixing segments, which are neighboring to each other, and between the second and third contact fixing segments which are neighboring to each other.

4. The sensor equipped wheel support bearing assembly as claimed in claim 3, in which the two sensors are spaced from each other in the circumferential direction a distance equal or approximate to $\frac{1}{2}+n$, where n is an integer of the pitch of arrangement of the rolling elements.

5. The sensor equipped wheel support bearing assembly as claimed in claim 1, in which the strain generating member is in the form of a thin plate member having, when viewed from top, a schematic shape similar to the strip shape of a uniform width or similar to the strip shape with its opposite side edge portions formed with respective cutout portions.

6. The sensor equipped wheel support bearing assembly as claimed in claim 1, in which the sensor units are arranged at top, bottom, right and left surface portions of the outer diametric surface of the outer member, which assume top, bottom, front and rear positions, respectively, relative to the tire tread surface.

7. The sensor equipped wheel support bearing assembly as claimed in claim 1, in which each of the sensor units includes three contact fixing segments and two sensors and the two sensors are spaced from each other in the circumferential direction a distance equal or approximate to $\frac{1}{2}+n$, where n is an integer, of the pitch of arrangement of the rolling elements.

* * * * *